Jan. 31, 1967 G. L. TRAVERS 3,301,303
TIRE CASING
Filed May 1, 1964
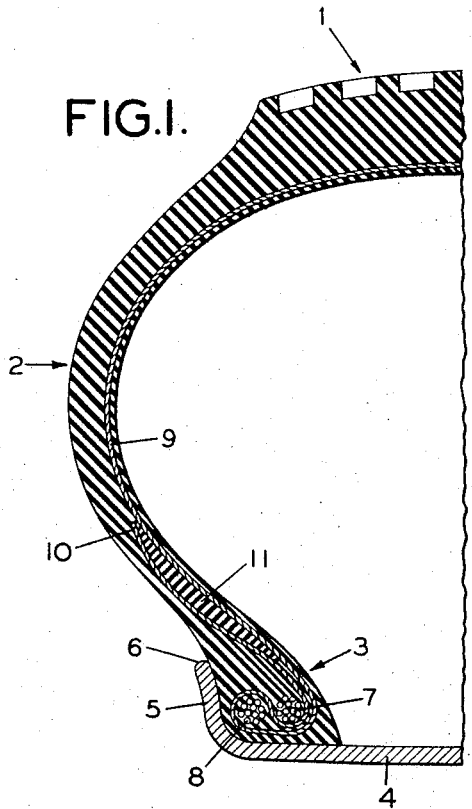
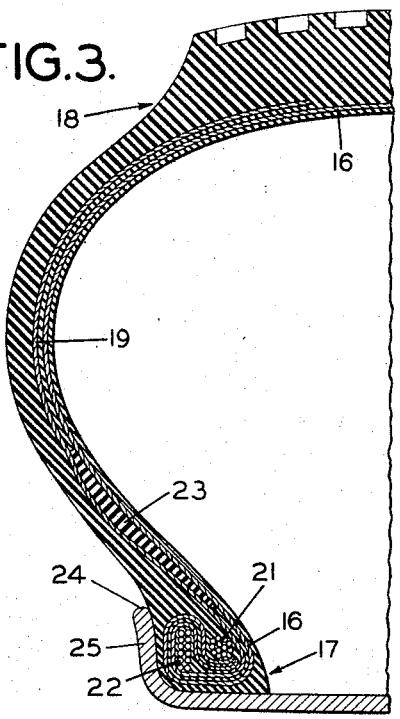
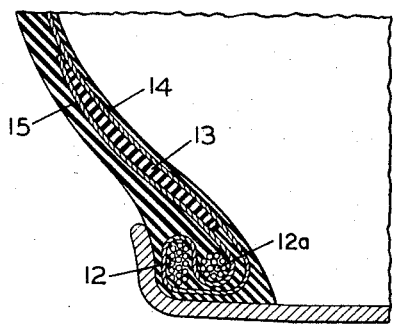
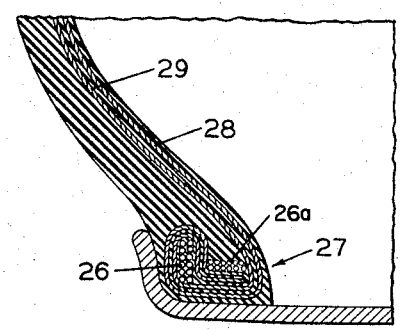
INVENTOR
GEORGES LOUIS TRAVERS
BY
HIS ATTORNEYS 3,301,303
TIRE CASING
Georges Louis Travers, Clermont-Ferrand, France, assignor to Compagnie Generale des Etablissements Michelin, raison sociale Michelin & Cie, Clermont-Ferrand, France
Filed May 1, 1964, Ser. No. 364,138
Claims priority, application France, May 4, 1963, 933,724
4 Claims. (Cl. 152—362)

This invention relates to improvements in tubeless and tube-containing tire casings of the type having carcasses including one or more plies of radial or substantially radial wires or cords, and, more particularly, to tire casings which are resistant to bead separation and sidewall and carcass breakage or separation adjacent to the beads.

It has long been recognized in the tire art that tires, especially those used for heavy duty purposes such as road building, off-highway use, on aircraft and the like, have a weak area between the sidewall and the bead where the curvature of the tire casing reverses. When special reinforcing plies are not present in the bead, the portions of the carcass plies wrapped around the bead cable have a tendency to break and unwrap from the bead cables under the influence or repeated bending and the heating resulting from such bending. The tendency for the carcass plies to unwrap and separate is increased if the edge of the carcass plies after being wrapped around the bead cable is located in the zone of reversal of curvature adjacent the edges of the rim flanges of the wheel on which the tire is mounted. When the beads are reinforced by means of additional plies arranged along the outer wall of the bead or turned back around the cable, the edges of these plies are generally located in the region of reverse curvature or in its immediate vicinity and constitute a zone of incipient ply separation and breakage under the influence of repeated bending.

In accordance with the present invention, the carcass ply or plies are rigidly anchored around the bead cables to prevent the unrolling or unwrapping of the plies and are further arranged to assure effective reinforcement of the zone of reversal of curvature of the sidewall especially adjacent the edge of the rim flanges of the wheel on which the tire is used.

In accordance with the invention, it has been found that firm anchoring of the carcass plies to the bead cables requires the length of the carcass wrapped around the cables to be as great as possible, and in any event, at lease equal to the height of the rim flanges of the wheel on which the tire is to be used. In order to wrap such a length of carcass ply or plies around a single cable in the bead, it is necessary to use a cable of large cross-sectional dimension. Such a cable is not economical and provides strength and weight greatly in excess of that required to resist the mechanical strain to which a bead cable is normally subjected. Consequently, in accordance with the present invention, in order to obtain a sufficient overlap of the ply with respect to the bead cables and the necessary anchoring of the plies in the bead, more than one cable is provided in each bead. The carcass plies are wrapped around the cables with successive changes in directions which vary from one cable to the next, for example, first extending along the inner wall of the tire, then across the base of the bead, then upwardly around the outermost cable and then downwardly between the cables and underneath the inner or lower cable and then up along the sides of the tire to a position outside of the region in which the curvature of the tire changes and in which the stresses are excessive. The shapes and type of cables used in the bead can vary considerably and as used herein, the term "cable" may include either single wires or multiple strand cables of various shapes, such as circular, oval, flat or the like.

In wrapping the carcass plies around the cables, a sufficient width is provided to enable the edge of the ply to extend to about the mid height or middle of the sidewall of the tire or into the vicinity of the tread. In any event, the edge of the carcass ply should not terminate in the zone of reverse curvature of the side of the tire adjacent the edge of the rim flange of a wheel to thereby avoid separation of the plies and incipient unwrapping of the plies from the bead cables. With the above-described relation between the plies and the bead cables, unwrapping of the plies from the cables is prevented. By avoiding the termination of the plies in zone of stress adjacent the edges of the rim flanges of the wheel on which the tire is mounted, separation and breakage of the plies likewise are avoided in what is otherwise a weak area of the tire. Further reinforcement can be obtained by interposing between the plies or the ends of the plies a layer of a harder, high modulus rubber which has been found to bond more securely than softer rubber to the cords or other elements making up the plies, thereby further preventing separation of the plies.

For a better understanding of the present invention, reference may be had to the accompanying drawings, in which FIGURE 1 is a partial cross-sectional view of a tire embodying the present invention mounted on a wheel rim;

FIGURE 2 is a partial cross-sectional view of a modified form of tire embodying the present invention mounted on a wheel rim;

FIGURE 3 is a partial cross-sectional view of still another form of tire embodying the present invention and mounted on a wheel rim; and FIGURE 4 is a partial cross-sectional view of still another form of tire embodying the present invention and mounted on a wheel rim.

As illustrated in FIGURE 1, a typical tire casing includes a tread 1, sidewalls 2 and beads 3 at their opposite free edges. The bead 3 is shown as being mounted on a rim 4 having a rim flange 5 having a free edge 6 located adjacent to the zone where the curvature of the sidewall 2 reverses and bends inwardly. As illustrated in FIGURE 1, each bead 3 contains two bead cables 7 and 8 which are of circular cross-section and are composed of a plurality of strands of metallic wire. A carcass ply 9 containing radially extending textile or metallic cords or cables extends around the tire from one bead 3 behind the sidewalls 2 and underneath the tread 1 to the other bead, not shown. As illustrated, the ply 9 extends under both of the cables 7 and 8, is turned over the outer cable 8, and then passes under the inner cable 7 and extends up along the sidewall of the tire to dispose the edge 10 of the ply at about the mid height of the tire and outside the zone of reversal of curvature of the tire. Interposed between the adjacent portions of ply 8 is a layer of hard rubber 11 which reinforces the zone joining the sidewall 2 to the bead 3.

A suitable hard rubber has a modulus of elasticity between about 350 g. per mm.$^2$ and 8000 g. per mm.$^2$ at 100% elongation.

In manufacturing a tire including two bead cables, the carcass ply or plies are laid on a tire-making drum with the bead 8 also encircling the drum and overlying the outer edge portion of the ply inwardly of its edge 10. The free edge 10 of the ply 9 is then folded inwardly over the bead cable 8 and the bead cable 7 is then lifted over and disposed inwardly of the cable 8 and on top of the inwardly folded portion of the ply or plies. In this way, the plies are wrapped almost completely around the cable 8 and both layers of each ply pass underneath and around the cable 7 when the tire is molded and vulcanized as shown in FIGURE 1. Regardless of the stresses applied to the ply 9, unwrapping of the ply 9 is not possible because of the side by side arrangement of the cables and the reverse winding of wrapping of the ply over and between the cables.

The bead modification shown in FIGURE 2 differs from that shown in FIGURE 1 in that the innermost cable 12a is circular in cross-section while the outermost bead cable 12 is oval or elliptical in cross-section. In this form of tire, a layer of harder rubber or elastomer 13 is interposed between the continuous ply 14 and its outer edge portion 15.

FIGURE 3 shows still another modification in which a carcass ply 16 of radially disposed cords or cables extends from one bead 17 to the other along the sidewalls and beneath the tread 18. Another carcass ply 19 extends from behind the tread 18 through the sidewalls and in a substantially parallel relation to the ply 16. Both of the plies extend under a circular cross-section bead cable 21 and a flat and vertically extending cable 22, then over the cable 22 and downwardly between the cables and terminate underneath the cable 21. A layer 23 of harder or higher modulus rubber is interposed between adjacent portions of the plies 16 and 19 through the zone of reverse curvature of the tire from about the outer edge 24 of the rim flange 25 to about the middle of the sidewall.

FIGURE 4 shows a tire similar in construction with the exception that two flat bead cables 26 and 26a disposed at substantially right angles to each other are located in each bead 27 and have the plies 28 and 29 extending beneath both of the bead cables upwardly and over, then downwardly along the inside of the bead cable 26 and underneath the bead cable 26a. In this form of tire casing, the hard rubber layer between the plies is omitted although it will be understood it can be included.

In all of the forms of beads illustrated, the length of the carcass plies which is wrapped around the cables is in excess of the height of the rim flange and the ends of the plies are all located either above or below the edge of the rim flange and thus out of the zone where ply separation normally occurs. Moreover, the interposed layer of hard rubber diminishes even further the risk of the plies separating and unrolling. As indicated above, the adherence between the cord reinforcement and rubber becomes greater with an increase in hardness of the rubber.

From the foregoing description of typical embodiments of the invention, it will be understood that the shape and size of the cables is susceptible to considerable variation and, if desired, more than two cables may be included in the bead although, in practice, two cables of the type and in the relationship to the carcass plies described above has proven entirely satisfactory.

The types of carcass plies used in the tire can be varied but the bead construction described is particularly suitable for use in connection with textile cord or metallic cord-containing plies in which the cords are disposed radially or meridianally with respect to the tire casing.

Inasmuch as the above-described embodiments of the invention are illustrative, the invention is limited only as defined in the following claims.

I claim:
1. A tire casing having a tread, sidewalls and beads, a zone of reverse curvature at the junction of each bead and sidewall and a carcass containing at least one carcass ply comprising at least an inner and an outer bead cable in said bead, said carcass ply extending axially outwardly beneath both of said cables, around one of said cables, radially inwardly between said outer cable and said inner cable and axially inwardly between said inner cable and the ply beneath both of said cables and having an edge portion terminating outside said zone of reverse curvature.
2. The tire casing set forth in claim 1 in which said edge portion extends to about the middle of said sidewall.
3. The tire casing set forth in claim 1 in which said edge portion extends to about the middle of said sidewall and comprising a layer of hard rubber between said ply and said ply edge portion.
4. The tire casing set forth in claim 1 in which said edge portion terminates in said bead.

References Cited by the Examiner
UNITED STATES PATENTS
2,994,358  8/1961  Trevaskis _____ 152—362
3,232,331  2/1966  Cappa et al. _____ 152—354

FOREIGN PATENTS
767,378  1/1957  Great Britain.

ARTHUR L. LA POINT, *Primary Examiner.*
C. W. HAEFELE, *Assistant Examiner.*